United States Patent [19]
Penney

[11] Patent Number: 5,594,508
[45] Date of Patent: Jan. 14, 1997

[54] DECODER USING ADAPTIVE NON-SEPARABLE DIGITAL FILTER

[75] Inventor: Bruce J. Penney, Beaverton, Oreg.

[73] Assignee: Tektronix, Inc., Wilsonville, Oreg.

[21] Appl. No.: 343,051

[22] Filed: Nov. 7, 1994

[51] Int. Cl.$^6$ ................................................ H04N 9/78
[52] U.S. Cl. ......................... 348/665; 348/667; 348/668
[58] Field of Search ........................... 348/665, 667–670, 348/663; H04N 9/78

[56] References Cited

U.S. PATENT DOCUMENTS

| | | | |
|---|---|---|---|
| 5,220,414 | 6/1993 | Rabii et al. | 348/665 |
| 5,361,103 | 11/1994 | Naka et al. | 348/665 |
| 5,416,532 | 5/1995 | Ko | 348/665 |

FOREIGN PATENT DOCUMENTS

| | | | |
|---|---|---|---|
| 0184492 | 8/1991 | Japan | H04N 9/78 |

*Primary Examiner*—Victor R. Kostak
*Attorney, Agent, or Firm*—Francis I. Gray

[57] ABSTRACT

A decoder using an adaptive non-separable digital filter has a correlation control circuit that generates from a composite video signal a set of filter coefficients for the non-separable digital filter. The filter coefficients are a function of a correlation angle for the image represented by the composite video signal. The non-separable digital filter, using the set of filter coefficients determined by the correlation angle, separates the composite video signal into its luminance and chrominance components. The non-separable digital filter may be approximated by a set of discrete filters having a common input, with each output being multiplied by a correlation factor, the correlation factors being the filter coefficients. The resulting multiplicands are summed to produce the separated luminance and chrominance components.

3 Claims, 2 Drawing Sheets

I # DECODER USING ADAPTIVE NON-SEPARABLE DIGITAL FILTER

BACKGROUND OF THE INVENTION

The present invention relates to video decoders, and more particularly to a decoder using an adaptive non-separable digital filter for more accurate decoding of diagonal features.

Existing video decoders adaptively select between comb and notch filters. The notch filter is selected when the horizontal correlation is greater than the vertical correlation. On the other hand the comb filter is selected when the vertical correlation is greater than the horizontal correlation. These filters give excellent results when the image represented by the video signal is horizontally or vertically correlated, but they lose precision as the correlation deviates from the horizontal or vertical. Composite video input signals may be correlated in any direction. Thus for images that are correlated at a diagonal, false color values may be introduced into the decoded video signal and luminance details may be blurred.

What is desired is a decoder that is adaptive to provide excellent results regardless of the angle of correlation of the video signal.

SUMMARY OF THE INVENTION

Accordingly the present invention provides a decoder using an adaptive non-separable digital filter for providing appropriate decoding regardless of the angle of correlation of an image represented by a composite video signal. The composite video signal is input to a correlation control circuit and to a non-separable digital filter. The correlation control circuit generates coefficients for the non-separable digital filter as a function of the angle of correlation. The non-separable digital filter, using the coefficients generated by the correlation control circuit, decodes the composite video signal into luminance and chrominance components. In a simplistic version the non-separable digital filter may be thought of as four filters: a notch filter, a comb filter, a positive forty-five degree filter and a negative forty-five degree filter. The composite video signal is input to each filter in parallel, and the output of each filter is multiplied by a correlation factor generated by the correlation control circuit as a function of the correlation angle. The resulting multiplicand outputs from the filters are then summed to produce the separated luminance and chrominance components adaptively decoded according to the angle of correlation of the image represented by the composite video signal. The non-separable digital filter may be realized in more than four directions, the filter coefficients determining the desired filtering direction.

The objects, advantages and other novel features of the present invention am apparent from the following detailed description when read in conjunction with the appended claims and attached drawing.

DESCRIPTION OF THE PREFERRED EMBODIMENT

Figure 1:
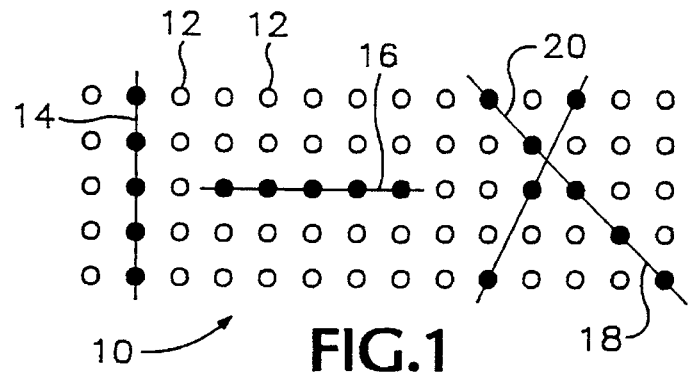
FIG. 1 is an illustration of a portion of a pixel display showing different correlation angles.

A portion of a video image display 10 is shown in FIG. 1 in the form of an array of pixels 12. A first line 14 of darkened pixels illustrates a vertically correlated image, and may be an edge where the pixels on one side are of one color and/or luminance value while the pixels on the other side are of a significantly different color and/or luminance value. A second line 16 illustrates a horizontally correlated image, a third line 18 illustrates a positive diagonally correlated image, and a fourth line 20 illustrates a negative diagonally correlated image. As is apparent from the third and fourth lines 18, 20 there are correlation components in both the horizontal and vertical directions for a diagonal line or edge.

Figure 2:
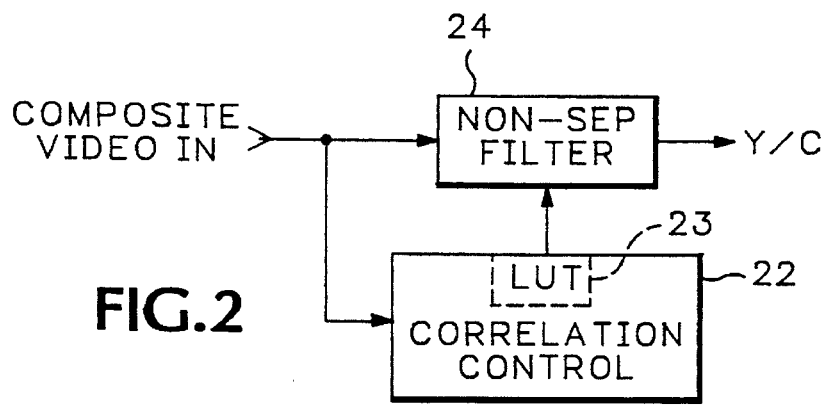
FIG. 2 is a basic block diagram for a decoder using an adaptive non-separable filter according to the present invention.

Referring now to FIG. 2 a composite video signal is input to both a correlation control circuit 22 and to a non-separable digital filter 24. A separable filter is one that filters only in one direction so that a separate filter is required for each direction along which filtering is desired. A non-separable filter is not limited to filtering in just one direction, but filters over more than one direction simultaneously. A separable filter is a special case of a non-separable filter where the filter coefficients exist only along one direction. The correlation control circuit 22 determines an angle of correlation, such as zero for horizontal, ninety for vertical and plus and minus angles for positive and negative diagonals.

Finding a direction of correlation for composite video signals is more difficult than for component video signals since composite video signals have the added complexity of color subcarrier. For component video signals the components are commonly digitized with an orthogonal sampling structure. This means that there are samples one line earlier and one line later which are directly above and below the current sample, or pixel. Therefore a measure of vertical correlation may be obtained by comparing the values of samples above and below the current sample. Similarly horizontal or even diagonal correlation may be evaluated by comparing horizontal or diagonally adjacent samples. For composite video signals the color subcarrier added to the luminance signal has different phases on different samples. So pixels that are chosen for comparison are selected that have the same color subcarrier phase. In the case of NTSC with 455/2 subcarrier cycles per line and sampling at four time the subcarrier frequency, samples spaced two samples left and right of the current sample represent the same subcarrier phase and may be compared to obtain a measure of horizontal correlation. Similarly samples above and below the current sample represent the same subcarrier phase and may be compared to obtain a measure of vertical correlation. For any other desired direction, such as diagonals, samples which have the same subcarrier phase along such direction may be compared to obtain a measure of diagonal correlation.

As a result of the determined angle from the correlation control circuit 22, a set of filter coefficients are loaded into the non-separable digital filter 24 to decode the pixels in that region. Theoretically the correlation control circuit 22 could determine a set of coefficients for any angle. As a practical matter, however, a discrete number of filter coefficients are determined for various angular ranges and loaded into a look-up table 23 within the correlation control circuit 22. Thus the number of sets of filter coefficients stored equals (180/N)+1, where N is the number of degrees for each angular range.

Figure 3:
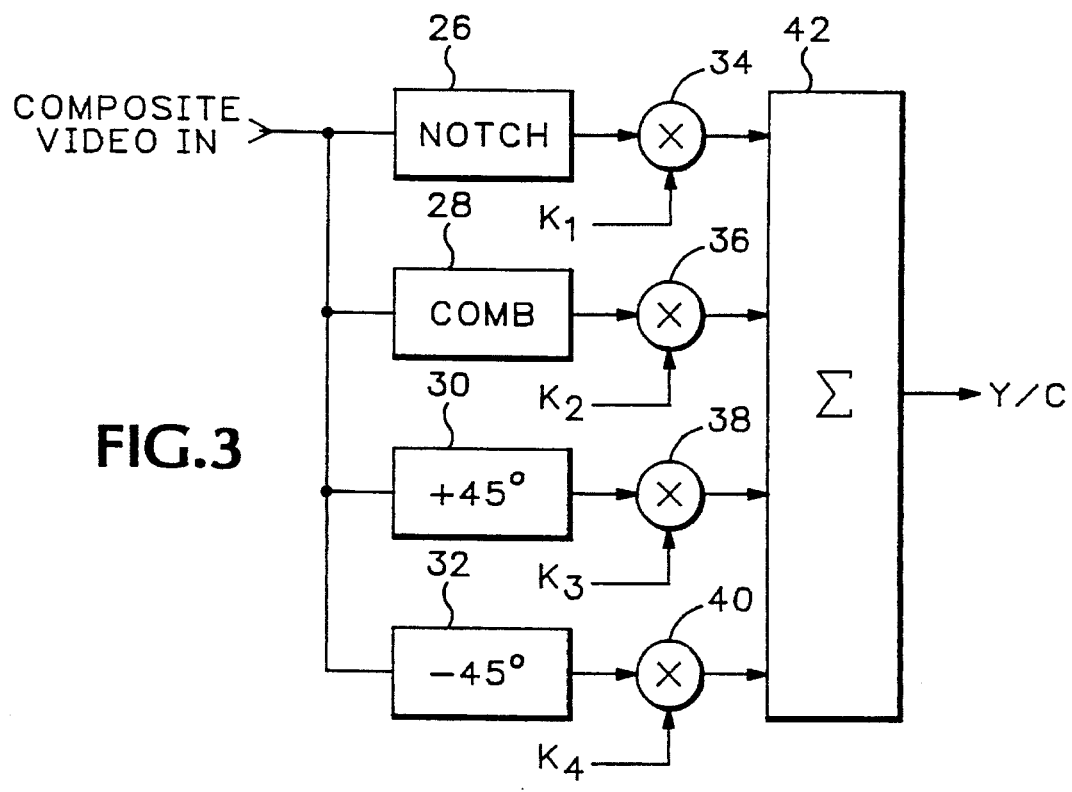
FIG. 3 is a conceptual block diagram for an adaptive filter corresponding to an adaptive non-separable filter according to the present invention.

Alternatively as shown in FIG. 3 the filter 24 conceptually may be formed of a set of separable filters, such as a notch filter 26, a comb filter 28, a plus diagonal filter 30 and a negative diagonal filter 32 where the diagonals are computed along ±forty-five degrees. The composite video signal is input in parallel to these discrete filters 26–32 to produce four sets of decoded luminance and chrominance components. The outputs of each discrete filter 26–32 are input to respective multipliers 34–40 to which also are input respective correlation factors K1–K4 from the correlation control circuit 22. The outputs from the multipliers 34–40 are input to a summation circuit 42 to produce the resulting decoded luminance and chrominance components Y/C.

Figure 4:
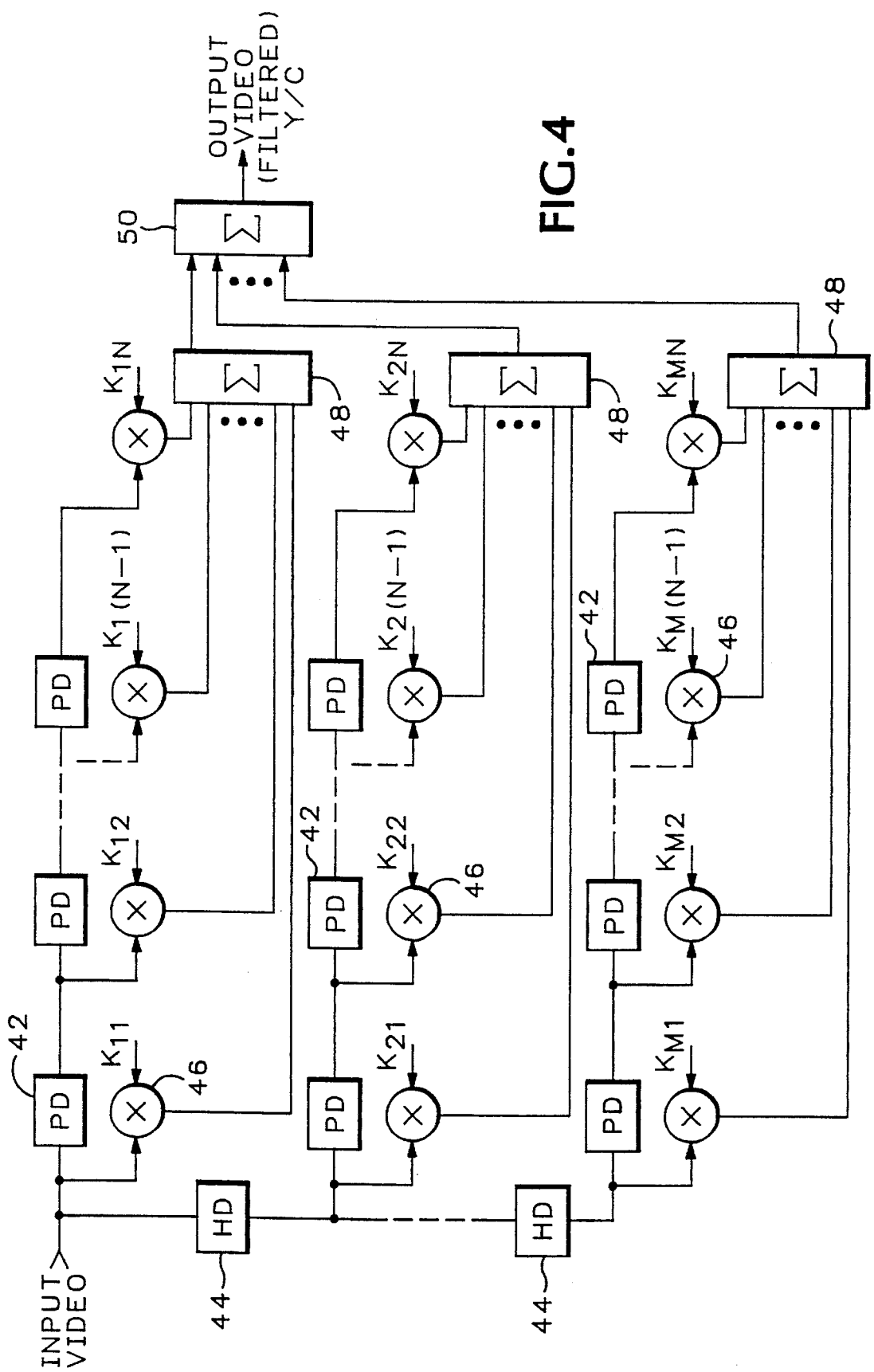
FIG. 4 is a block diagram for a programmable adaptable non-separable filter according to the present invention.

A generalized adaptive non-separable digital filter 24 is shown in FIG. 4. The input video is input to a series of pixel (horizontal) delay elements (PD) 42 and to a series of line (vertical) delay elements (HD) 44. The input and output of each pixel delay element 42 is input to a multiplier circuit 46 where it is weighted according to a filter coefficient $K_{mN}$ which is programmable according to the correlation angle. The N outputs from each group of multiplier circuits 46 are input to a first summation circuit 48. The m outputs from the first summation circuits 48 are input to an output summation circuit 50. The output of the output summation circuit 50 is the input video signal filtered along a direction determined by the filter coefficients $K_{mN}$ to produce the luminance and chrominance components.

Thus the present invention provides a decoder using an adaptive non-separable digital filter, the decoder determining filter coefficients for the non-separable digital filter as a function of the angle of correlation within the image represented by a composite video input signal, to produce more accurately separated luminance and chrominance components for the composite video input signal.

What is claimed is:

1. A decoder comprising:

means for generating filter coefficients from a composite video signal as a function of an arbitrary correlation angle for an image represented by the composite video signal; and means for adaptively, non-separably filtering the composite video signal using the filter coefficients from the generating means to produce corresponding luminance and chrominance component signals for the composite video signal.

2. A decoder as recited in claim 1 wherein the generating means comprises:

means for determining the arbitrary correlation angle from the composite video signal; and a look-up table containing the filter coefficients for discrete angle ranges that is accessed by the arbitrary correlation angle to produce the filter coefficients for the adaptively, non-separably filtering means.

3. A decoder as recited in claim 1 wherein the adaptively, non-separably filtering means comprises:

a notch filter having the composite video signal as an input and providing a notch filter signal as an output;

a comb filter having the composite video signal as an input and providing a comb filter signal as an output;

a positive diagonal filter having the composite video signal as an input and providing a positive diagonal filter signal as an output;

a negative diagonal filter having the composite video signal as an input and providing a negative diagonal filter signal as an output;

means for multiplying each of the filter signals by a corresponding correlation factor from the generating means, the correlation factors being the filter coefficients corresponding to the arbitrary correlation angle; and means for summing the outputs from the multiplying means to produce the corresponding luminance and chrominance components for the composite video signal.

* * * * *